3,708,514
α-(p-CHLOROPHENOXY)ISOBUTYRIC ACID DERIVATIVES
Masuro Murakami, 19-1-502 Sengoku 2-chome; Ichiro Isaka, 1-4 Shimohoya 3-chome; Norio Kawahara and Teruyo Kashiwagi, both of 16-1 Hasune 3-chome; Tadao Shibanuma, 2-29 Shimo, Kita-ku; and Tetsuya Shiozaki, 198 Kashiwagi 2-chome, all of Tokyo, Japan
No Drawing. Filed July 30, 1970, Ser. No. 59,742
Claims priority, application Japan, Aug. 14, 1969, 44/63,871
Int. Cl. C07c 153/01
U.S. Cl. 260—455 R                3 Claims

ABSTRACT OF THE DISCLOSURE

Novel (α-chlorophenoxy)isobutyric acid derivatives of the formula

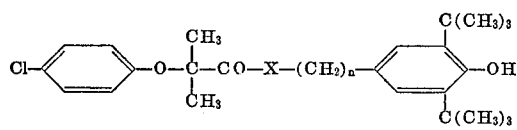

wherein X stands for sulfur, oxygen or the imino group and M is 0 or 1,
which are odorless solid having a pharmacological effect of reducing the level of cholesterol and triglyceride in the blood.

DETAILED EXPLANATION OF THE INVENTION

The present invention relates to novel α-(p-chlorophenoxy)isobutyric acid derivatives of the formula

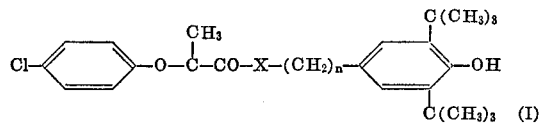

wherein X stands for sulfur, oxygen or the imino group and $n$ is 0 or 1.

These compounds of the present invention are new compounds having a good activity of reducing the level of cholesterol and triglyceride in the blood. They are more potent than the known hypocholesteremic agent "clofibrate" i.e. ethyl α-(p-chlorophenoxy)isobutyrate. Moreover, they have advantages of being easily formulated into pharmaceutical preparations as compared with clofibrate, in that they are odorless solid substances while clofibrate is a liquid substance having a peculiar bad smell and is not suitable for the formulation into tablets or powders.

The compounds of the present invention are obtained by reacting α-(p-chlorophenoxy)isobutyric acid or a reactive derivative thereof with a 2,6-di-tert-butylphenol derivative of the formula

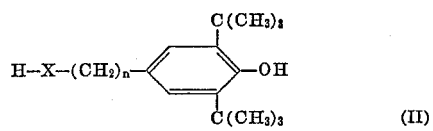

wherein X and $n$ have the same meanings as above.

More precisely, the compounds of the Formula I are obtained by reacting α-(p-chlorophenoxy)isobutyric acid or a reactive derivative thereof, for example an acid halide such as acid chloride, acid bromide or the like, or a derivative having a reactivity equivalent to the acid halide, with equimolar or excess amount, preferably about equimolar amount, of a 2,6-di-tert.-butylphenol derivative of the Formula II in an organic solvent such as chloroform, dichloroethane, ethyl acetate, toluene, benzene or the like.

The reaction proceeds at room temperature. However, it may be carried out under heating. When an α-(p-chlorophenoxy)isobutyric acid halide is used as the starting material, it is preferred to carry out the reaction in the presence of a tertiary base such as pyridine, triethylamine or the like.

The compounds of the present invention are administered orally in the form, for example, of tablets, powders, pills, capsules or the like. Their clinical dose for adult by oral administration is usually 200-400 mg. at a time, with 2-3 times administration a day. The dose may suitably be adjusted to the condition and ages of patients.

In the following, the invention is further illustrated by examples:

Example 1

In 100 ml. of anhydrous pyridine, 23.2 g. of 2,6-di-tert.-butyl-4-mercaptophenol are dissolved under nitrogen stream. To the solution obtained, a solution prepared separately by dissolving 25.8 g. of α-(p-chlorophenoxy)isobutyric acid chloride in 100 ml. of anhydrous benzene is added dropwise at 25° C. After completion of the addition, the reaction mixture is stirred for 4 hours and allowed to stand overnight.

The pH of the reaction mixture is adjusted to 1-2 by adding 10% hydrochloric acid, and then extracted 4 times with 100 ml. each of benzene. The extracts are combined together, washed with saturated aqueous solution of sodium bicarbonate and then with water, and dried over anhydrous sodium sulfate. After drying, the benzene solution is concentrated under reduced pressure and the residue obtained is recrystallized from n-hexane whereby 27.7 g. of S-(3,5-di-tert.-butyl-4-hydroxy)phenyl α-(p-chlorophenoxy)isobutanethioate having a melting point of 110–111 C. are obtained. Yield: 65.4%.

Elementary analysis (as $C_{24}H_{31}O_3ClS$).—Calc. (percent): C, 66.26; H, 7.18; S, 7.37. Found (percent): C, 65.92; H, 7.16; S, 7.56.

IR $\gamma_{max.}^{KBr}$ cm.$^{-1}$: 3610 (OH) observed 2060 (SH) not observed

Example 2

In 100 ml. of dry benzene, 15 g. of 3,5-di-tert.-butyl-4-hydroxyaniline and 13 ml. of triethylamine are dissolved. While stirring at 10–15° C., 80 ml. of dry benzene containing 21 g. of α-(p-chlorophenoxy)isobutyric acid chloride are added dropwise to the solution in the course of 1 hour. After the stirring is continued for further 4 hours, the reaction mixture is washed with 50 ml. of distilled water, 50 ml. of 5% aqueous hydrochloric acid solution, 50 ml. of aqueous sodium bicarbonate solution and 50 ml. of distilled water, three times with each. The organic layer is dried on anhydrous magnesium sulfate and then the solvent is distilled off under reduced pressure. The crystalline residue is recrystallized from aqueous ethanol after the treatment with active carbon, whereby 21.0 g. of N-(3,5-di-tert.-butyl-4-hydroxy)phenyl α-(p-chlorophenoxy) isobutanamide having a melting point of 157–158° C. are obtained. Yield: 74%.

Elementary analysis (as $C_{24}H_{32}NO_3Cl$).—Calc. (percent): C, 68.99; H, 7.66; N, 3.35. Found (percent): C, 68.97; H, 7.66; N, 3.60.

Example 3

In 180 ml. of dry benzene, 18 g. of 3,5-di-tert.-butylhydroquinone and 16 ml. of triethylamine are dissolved. The solution is cooled at 5–10° C. and to which 100 ml. of dry benzene containing 26 g. of α-(p-chlorophenoxy)isobutyric acid chloride are added dropwise in the course of one hour, while stirring. After the starting is continued for 3 hours at room temperature, the reaction mixture is washed with 50 ml. of distilled water, 50 ml. of 5% aqueous sodium bicarbonate solution and 50 ml. of distilled water, 3 times with each. The organic layer is dried over anhydrous magnesium sulfate and the solvent is distilled off under reduced pressure. The resultant crystalline residue is treated with petroleum ether and the crystals precipitated are collected by filtration. After recrystallization from n-hexane, 23.7 g. of (3,5-di-tert.-butyl-4-hydroxy)phenyl α-(p-chlorophenoxy)isobutyrate having a melting point of 123–124° C. are obtained. Yield: 70%.

Elementary analysis (as $C_{24}H_{31}O_4Cl$).—Calc. (percent): C, 68.80; H, 7.46. Found (percent): C, 68.94; H, 7.47.

Example 4

To a solution obtained by dissolving 190 mg. of 3,5-di-tert.-butyl-4-hydroxybenzyl alcohol in 18 ml. of anhydrous pyridine, 188 mg. of α-(p-chlorophenoxy)isobutyric acid chloride are added under cooling with ice. The reaction mixture is then stirred for 4 hours at room temperature and allowed to stand overnight. The mixture is dispersed into 10 ml. of 5% aqueous sulfuric acid solution, and the dispersion is extracted with ether. The ether solution is washed with water, dried over anhydrous sodium sulfate, and concentrated under reduced pressure. The resultant residue is recrystallized from petroleum ether whereby 150 mg. of (3,5-di-tert.-butyl-4-hydroxy)benzyl α-(p-chlorophenoxy)isobutyrate having a melting pointof 75–76° C. are obtained as needles. Yield: 43%.

Elementary analysis (as $C_{25}H_{33}O_4Cl$).—Calc. (percent): C, 69.35; H, 7.68. Found (percent): C, 69.22; H, 7.46.

The product is identified by means of NMR:NMR (in $CDCl_3$) τ:4.93 (2H singlet, —$COOCH_2$—).

Example 5

In 6 ml. of anhydrous pyridine, 1.2 g. of 3,5-di-tert.-butyl-4-hydroxyphenyl methanethiol are dissolved under nitrogen stream. The solution is added dropwise to 2 ml. of anhydrous pyridine containing 1.2 g. of α-(p-chlorophenoxy)isobutyric acid chloride, while stirring at 10–20° C. After the stirring is continued for further 5 hours at room temperature, the reaction mixture is dispersed into 5% aqueous hydrochloric acid solution under cooling. The dispersion is extracted with ether, and the ether layer is dried on anhydrous sodium sulfate. The residue obtained by concentration of the dried ether solution is recrystallized from aqueous ethanol whereby 1.5 g. of S-(3,5-di-tert.-butyl-4-hydroxy)benzyl α-(p-chlorophenoxy)isobutanethioate having a melting point of 73–74° C. are obtained as colorless crystals. Yield: 70%.

Elementary analysis (as $C_{25}H_{33}O_3SCl$).—Calc. (percent): C, 66.87; H, 7.41; S, 7.14; Cl, 7.89. Found (percent): C, 66.45; H, 7.47; S, 6.98; Cl, 8.04.

Example 6

Preparation of tablets

Prescription:

| | G. |
|---|---|
| S-(3,5-di-tert.-butyl - 4 - hydroxy)phenyl α-(p-chlorophenoxy)isobutanethioate | 2.5 |
| Lactose | 0.4 |
| Starch | 0.48 |
| Talc | 0.1 |
| Magnesium stearate | 0.02 |

The whole is made into 10 tablets by means of a 10 mm.-deep cup punch.

The tablets may be coated if desired, according to a conventional method.

Experiment 1.—The effect on the level of serum triglyceride of S-(3,5-di-tert.-butyl-4-hydroxy)phenyl α-(p-chlorophenyl)isobutanethioate obtained in Example 1 was investigated in animals, in comparison with that of clofibrate, Thirty-four male rats of Sprague-Dawley strain were divided into four groups. The first group of 10 rats was fed with a commercially available solid diet (from Nippon CLEA Co.) and served as the control. The second group of 8 rats and the third group of 8 rats were fed with the same solid diet containing S-(3,5-di-tert.-butyl-4-hydroxy)phenyl α-(p-chlorophenoxy)isobutanethioate in an amount ratio of 0.25% or 0.45%, respectively. The fourth group of 8 rats was fed with the same solid diet containing clofibrate in an amount ratio of 0.25%. (The amount of S-(3,5 - di-tert.-butyl - 4-hydroxy)phenyl α-(p-chlorophenoxy)isobutanethioate added to the diet for the third group is equimolar to clofibrate added to the diet for the fourth group.)

After two weeks, each animal was sacrificed and the amount of triglyceride in the serum and liver was determined by Kawade method (Mie Medical Journal, 1 (3), 399–407 (1962)). The results obtained are shown in the following Table 7:

TABLE 1

| | Triglyceride in serum (mg./dl.) | Rate of reduction (percent) | Triglyceride in liver (percent) |
|---|---|---|---|
| Group: | | | |
| 1 | 143.4±20.8 | | 4.3±0.7 |
| 2 | 42.9±8.9 | 70.1 | 5.2±0.6 |
| 3 | 35.6±3.5 | 75.2 | 5.1±0.7 |
| 4 | 63.9±6.3 | 55.4 | 4.5±0.5 |

Experiment 2.—The effect on the level of plasma cholesterol of S-(3,5-di-tert.-butyl-4-hydroxy)phenoxy α-(p-chlorophenoxy)isobutanethioate obtained in Example 1 was investigated in animals, in comparison with that of clofibrate.

Twenty-seven male mice of JCR strain were divided into three groups. The first group of nine mice was fed with a commercial solid diet (from Nippon CLEA Co.) and served as the control. The second group of nine mice was fed with the same solid diet but containing S-(3,5-di-tert.-butyl - 4-hydroxy)phenyl α-(p-chlorophenoxy)isobutanethioate in an amount ratio of 0.45% and the third group of the nine mice with the same solid diet but containing clofibrate applied thereto in an amount of 0.25%.

After two weeks, each animal was sacrificed and the amount of plasma cholesterol was determined by Zack Henley method (Am. Jour. Clin. Path., 27, 583 (1957)). The results are shown in the following Table 2:

TABLE 2

| | Cholesterol in plasma (mg./dl.) | Rate of reduction (percent) |
|---|---|---|
| Group: | | |
| 1 | 139.56±6.89 | |
| 2 | 87.15±2.86 | 47.6 |
| 3 | 126.23±10.23 | 9.5 |

Experiment 3.—The effect on the level of plasma cholesterol of M-(3,5 - di-tert.-butyl-4-hydroxy)phenyl α-(p-chlorophenoxy)isobutanamide obtained in Example 2 was investigated in animals, in comparison with that of clofibrate.

Thirty-six mice were divided into three groups. The first group of 12 mice was fed with a commercially available powdery diet (from Nippon CLEA Co.). The second group of 12 mice was fed with the same powdery diet but containing N-(3,5 - di-tert.-butyl-4-hydroxy)phenyl α-(p-chlorophenoxy)isobutanamide in an amount ratio of 0.43% and the third group of 12 mice with the same powdery diet but containing clofibrate in an amount ratio of 0.25%. (The amount of N-(3,5 - di-tert-butyl-4-hydroxy)phenyl α-(p-chlorophenoxy)isobutaneamide added to the diet for the second group is equimolar to clofibrate added to the diet for the third group.)

After two weeks, each animal was sacrificed and the amount of plasma cholesterol was determined by a modification of Zack Henley method. The results obtained are given in the following Table 3:

TABLE 3

| Group: | Cholesterol in plasma (mg./dl.) | Rate of reduction (percent) |
|---|---|---|
| 1 | 167.0±14.3 | |
| 2 | 60.1±5.8 | 64.0 |
| 3 | 115.1±4.4 | 31.1 |

What is claimed is:
1. The α-(p-chlorophenoxy)isobutyric acid derivatives of the formula

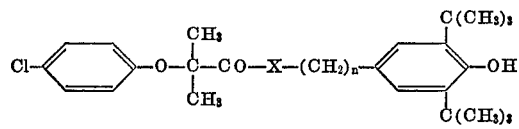

wherein X is sulfur, and $n$ is 0 or 1.

2. S-(3,5 - di-tert.-butyl-4-hydroxy)phenyl α-(p-chlorophenoxy)-isobutanethioate.

3. S-(3,5 - di-tert-butyl-4-hydroxy)benzyl α-(p-chlorophenoxy)isobutanethioate.

References Cited
FOREIGN PATENTS
6,332   3/1967   Japan _____ 260—455 R

OTHER REFERENCES

Hellman et al.: 'Red. of Chloesterol & Lipids etc.;" (1963), CA, 60, p. 6115 (1964).

De Michelis et al.: 'Lipid-Lowering Effects of Diisopropylamine, etc." (1969), CA 72, No. 11204 g. (1970).

Canonica et al.: The Hypocholesterolemic Action of Some Sgn. Compounds," (1960), CA 59, p. 1016 (1963).

LEWIS GOTTS, Primary Examiner

G. HOLLRAH, Assistant Examiner

U.S. Cl. X.R.

260—473 C, 559 B, 424, 301, 308, 324